United States Patent [19]

Simmons

[11] Patent Number: 5,333,408
[45] Date of Patent: Aug. 2, 1994

[54] TACKLE BOX WITH INTERIOR ILLUMINATION

[76] Inventor: David O. Simmons, 16609 Black Kettle Dr., Leander, Tex. 78641

[21] Appl. No.: 26,529

[22] Filed: Mar. 4, 1993

[51] Int. Cl.$^5$ ............................................. A01K 97/06
[52] U.S. Cl. ...................... 43/54.1; 362/154; 43/57.1
[58] Field of Search ............ 43/57.1, 54.1, 17.5; 206/315.11; 362/154, 156

[56] References Cited

U.S. PATENT DOCUMENTS

| | | | |
|---|---|---|---|
| 2,538,151 | 1/1951 | Grasak | 362/156 X |
| 2,751,489 | 6/1956 | Cole | 43/54.1 X |
| 3,938,132 | 2/1976 | Cunningham | 43/4 |
| 4,697,379 | 10/1987 | McPhaul | 43/54.1 |
| 4,739,577 | 4/1988 | Lanius | 43/57.1 X |
| 4,855,881 | 8/1989 | Pence | 362/156 |
| 5,092,075 | 3/1992 | Campos | 43/54.1 |
| 5,143,440 | 9/1992 | Trampota | 362/156 |

FOREIGN PATENT DOCUMENTS 883546 11/1961 United Kingdom ............... 362/156

*Primary Examiner*—P. Austin Bradley
*Assistant Examiner*—Jeanne M. Elpel

[57] ABSTRACT

A portable container having a hinged lid and an electric lighting assembly mounted to the body of the container. The lighting assembly is located external to the interior storage compartment of the container when the lid is in the closed position. The lighting assembly includes an electric lamp for illuminating the interior of the container when the lid is in the open position and an electric lamp for illuminating the path of the person carrying the container when the lid is in the closed position.

20 Claims, 6 Drawing Sheets

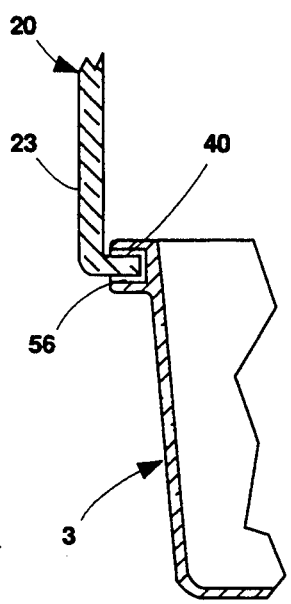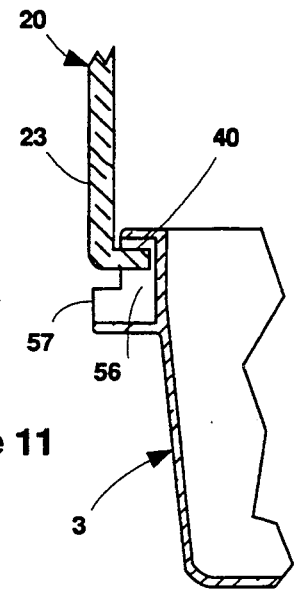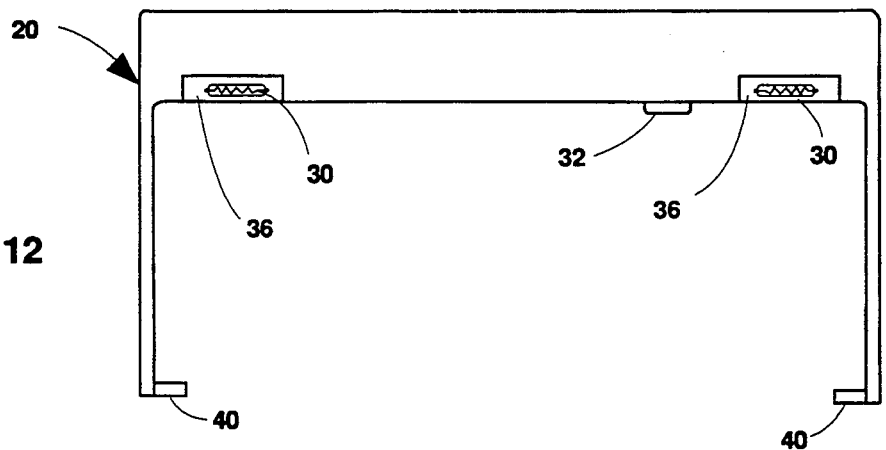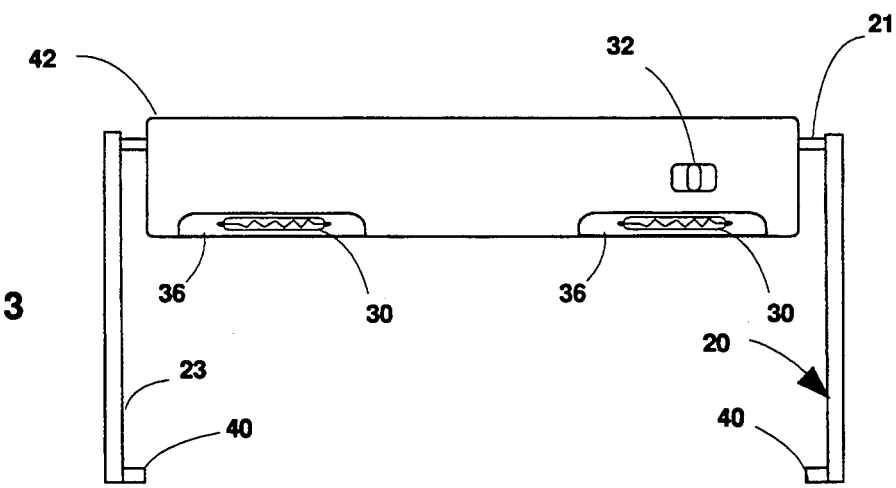

TACKLE BOX WITH INTERIOR ILLUMINATION

BACKGROUND OF THE INVENTION

1. Field of the Invention

This invention relates generally to tackle boxes having a box section consisting four exterior walls, a bottom, folding trays, an openable cover, and a handle for carrying the tackle box. More specifically, it relates to multipurpose-type fishing tackle boxes with interior illumination and with a flashlight for lighting the path of a person carrying the tackle box.

2. Description of the Prior Art

In many cases, the fisher person engage in fishing before dawn or after sunset. For matters of safety as well as convenience, it is typical that the fisher person has a reliable source of light for making their way to their fishing location and to aid them in preparing their fishing gear. Whether it be for navigating their way to their fishing location or preparing their fishing gear once they get there, this generally does not leave a free hand to hold a flashlight or other type of illumination. For example, while making their way to their fishing spot, they will often times be carrying at least a tackle box and a fishing rod. And when preparing their gear at their fishing spot, adequate light is required for them to rummage through their tackle box in search of items such as hooks, sinkers, bobbers, lures, knives and other items. With many sharp and dangerous items present in the tackle box, it is readily apparent that it would be quite hazardous to rummage through the tackle box in the dark. Additionally, when attaching a hook, sinker, or lure to the line, both hands are generally required for threading the line through a small eyelet and tying off the line securely.

Tackle boxes with interior illumination, integral and modular flashlights, and a combination thereof are well-known in the art. At least four United States patents have addressed the problem of interior illumination of tackle boxes and/or the problem of utilizing a flashlight in conjunction with carrying a tackle box. U.S. Pat. No. 2,751,489 to Cole, issued in June of 1956, discloses a tackle box with battery-powered interior illumination and navigational lighting. Cole describes a tackle box with a battery power supply in the handle of the tackle box, interior illumination provided by lamps within the tackle box, and navigational lighting provided by a separate light which can be held in the hand or attached to the handle of the tackle box.

Kurek, U.S. Pat. No. 2,765,576, discloses a translucent tackle box having interior illumination. In a preferred embodiment, interior illumination is provided by a light source which illuminates the tackle box by virtue of the tackle box being translucent, and therefore enabling the light to pass through the walls of the tackle box.

McPhaul, U.S. Pat. No. 4,697,379, discloses a tackle box having an integral flashlight and interior-illuminating lights. In a preferred embodiment, the flashlight consists of a lamp, parabolic reflector, and a lens mounted in the body of the tackle box while the interior illumination is provided by a lamp in the body of the tackle box and another lamp on the underside of the lid. Power is provided to the lamps from a battery located in the body of the tackle box via an electrical circuit consisting of connectors, conductors, and switches.

Moore, U.S. Pat. No. 4,841,661, discloses a 'Fisherman's Combination Chest' which includes a cavity in which a removable flashlight is seated and held in place by a manually releasable latch acting between the body of the chest and the flashlight.

Although each of these patents address the problem of interior illumination of tackle boxes and/or the problem of utilizing a flashlight in conjunction with carrying a tackle box, in each case, there exists one or more significant disadvantages with the structures disclosed in relation to the invention of this disclosure. The primary disadvantage with the structures disclosed by Cole, Kurek, and McPhaul is that there is significant circuitry required as well as numerous individual components. In each of these cases, the remote location of the power supply with respect to the lamps which provide interior illumination and/or exterior illumination (flashlight) requires a wiring harness having a number of conductors and connectors to carry the electrical energy from the battery to the lamps. As the number of components increases, so does the manufacturing and assembly costs and the potential for failure. The conductors and connectors are very prone to failure due to corrosion and the conductors are additionally prone to short circuiting by sharp objects such as hooks and knives. In regards to the patent of Kurek, the invention disclosed is also differentiated from the invention of Kurek as it includes an external light for lighting the path of the person carrying the tackle box. The invention disclosed by Moore is differentiated from the invention of this disclosure by the fact that it does not include any inherent capability for conveniently and reliably lighting the interior of the tackle box without the use of at least one hand. Another key advantage of this invention over that of the prior art is that the space within the tackle box is not occupied by the lighting components, thereby providing more space for fishing equipment.

SUMMARY OF THE INVENTION

The present invention overcomes or substantially reduces the noted deficiencies of the prior art by providing a structure which does not reduce the available interior space, being manufactured efficiently, requiring a minimal number of components, and being self-contained to greatly reduce the potential of failure due to corrosion and/or short circuiting.

The invention generally comprises a portable tackle box for fishing apparatus and other equipment which requires separation, containment, and organization. Specifically, in a preferred embodiment, the invention comprises a tackle box providing interior illumination such that the contents of the tackle box can be easily identified and worked with in the dark, and a flashlight for lighting the path of the person carrying the tackle box.

An important feature of the invention lies in the interior illumination and the flashlight being in combination with the handle of the tackle box. The benefits of this structure are: 1) the available space within the tackle box is not reduced by the lighting components 2) the electrical components can be readily contained in an assembly which is water-tight to protect against corrosion and whose location greatly reduces, if not eliminates, the potential of short circuiting due to sharp hooks and knives, and 3) the invention can be manufactured more efficiently with better reliability since there can be fewer components.

Other objects and advantages of the invention will become apparent to those skilled in the art from the detailed description of the invention below and the accompanying drawings.

BRIEF DESCRIPTION OF THE DRAWINGS

FIG. 10 is a fragmentary expanded section of the portion indicated by the line 10—10 in FIG. 2.

FIG. 11 is a fragmentary expanded section of the portion indicated by the line 11—11 in FIG. 8.

FIG. 12 is a side elevation of a handle having two interior illuminating lights, both lights being integral to the handle.

FIG. 13 is a side elevation of a handle having a lighting module with two interior illuminating lights.

Figure 1:
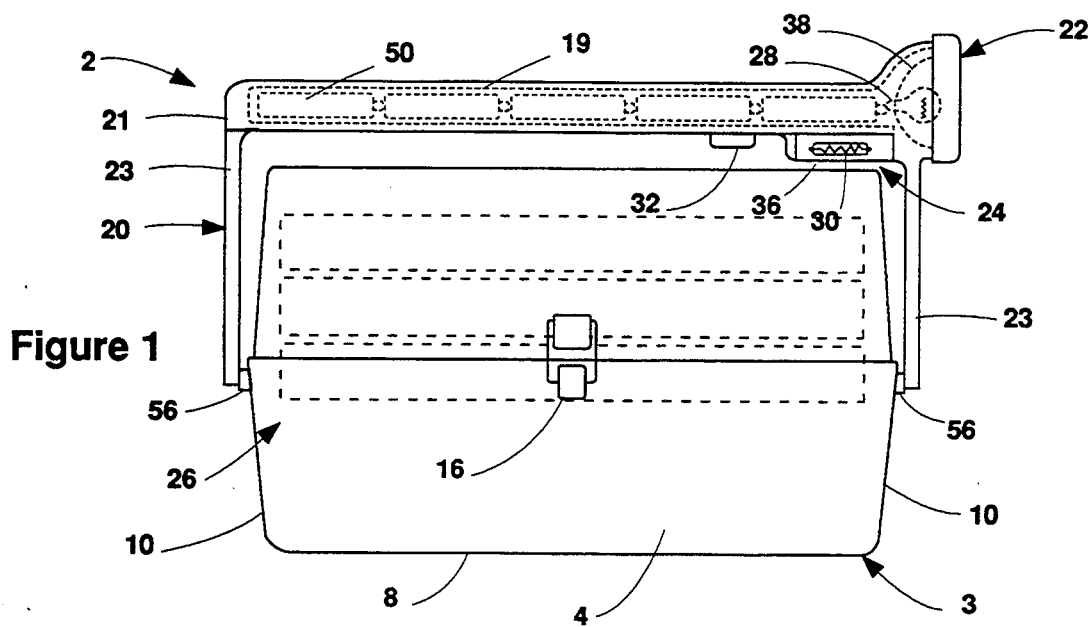
FIG. 1 is a front elevation of a tackle box having a flashlight and an interior illuminating light which are integral to the handle, the interior illuminating light having a light diffuser.

| Reference Numerals in Drawings: | |
|---|---|
| 2 Tackle Box | 3 Box Section |
| 4 Front Exterior Wall | 6 Rear Exterior Wall |
| 8 Bottom | 10 End Wall |
| 14 Lid | 16 Buckle |
| 18 Hinge | 19 Battery Compartment |
| 20 Handle | 21 Transverse Beam |
| 22 Flashlight Portion | 23 Side Arm |
| 24 Interior Illuminating Light | 26 Folding Tray Assembly |
| 28 Flashlight Bulb | 30 Interior Illuminating Light Bulb |
| 32 Switch Button | 34 Handle Grip |
| 36 Light Diffuser | 38 Reflector |
| 40 Pin | 42 Lighting Module |
| 44 Interior Wall | 46 Compartment |
| 48 Recessed Portion | 50 Battery |
| 52 Notch | 54 Spring |
| 56 Carriage | 57 Cradle |
| 58 Power Supply | 60 Positive Terminal |
| 61 Single Pole Double Throw Switch | 62 Single Pole Double Throw Switch |
| 64 Interior Illuminating Bulb Pos Lead | 66 Flashlight Bulb Positive Lead |
| 68 Interior Illuminating Bulb Neg Lead | 70 Flashlight Bulb Negative Lead |
| 72 Negative Terminal | |

DESCRIPTION OF THE PREFERRED EMBODIMENTS

For the preferred embodiments of the invention shown in the accompanying figures and described herein, it will be understood that the present invention relates specifically to the physical configuration of the invention and generally to the configuration of the related electrical circuitry.

A tackle box 2 is constructed of any suitable material such as plastic, metal or wood. Due to corrosion, the preferred material used to construct tackle box 2 is plastic. Various common types of plastics are especially suitable for this purpose.

Tackle box 2 includes end walls 10, bottom 8, front exterior wall 4, rear exterior wall 6, lid 14, and handle 20 equipped with buckle 16 which securely fastens lid 14 when in the closed position. The space enclosed by the substantially rectangular tackle box 2 is approximately equally divided between box section 3 and lid 14. Lid 14 is mounted to box section 3 by hinges 18 such that it can be readily opened and closed. Handle 20 substantially includes side arms 23 and transverse beam 21. Side arms 23 have pins 40 at their lower extreme which are seated in carriages 56 located on each end wall 10, thereby attaching handle 20 to box section 3.

Referring now to FIGS. 1-6, tackle box 2 includes folding tray assembly 26 which is mounted to box section 3 such that when in the retracted position, folding tray assembly 26 is partially within box section 3 and the lower part of the space defined by lid 14 when it is in the closed position. When in the extended position, folding tray assembly 26 substantially overhangs lid 14.

Figure 2:
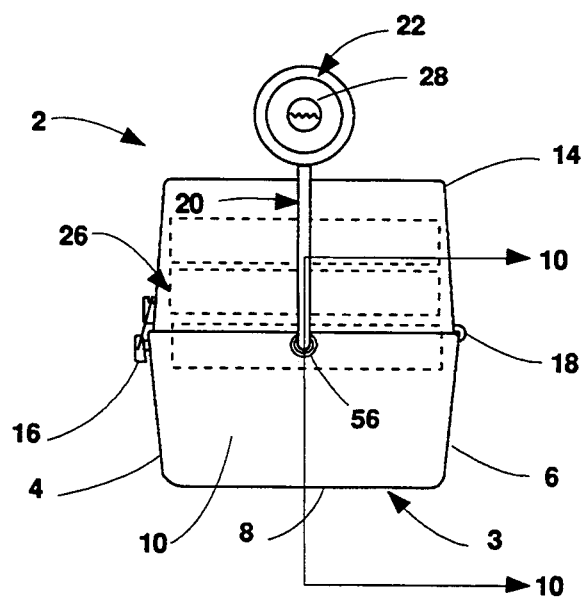
FIG. 2 is a side elevation of the tackle box of FIG. 1, shown with the lid in the closed position.
Figure 3:
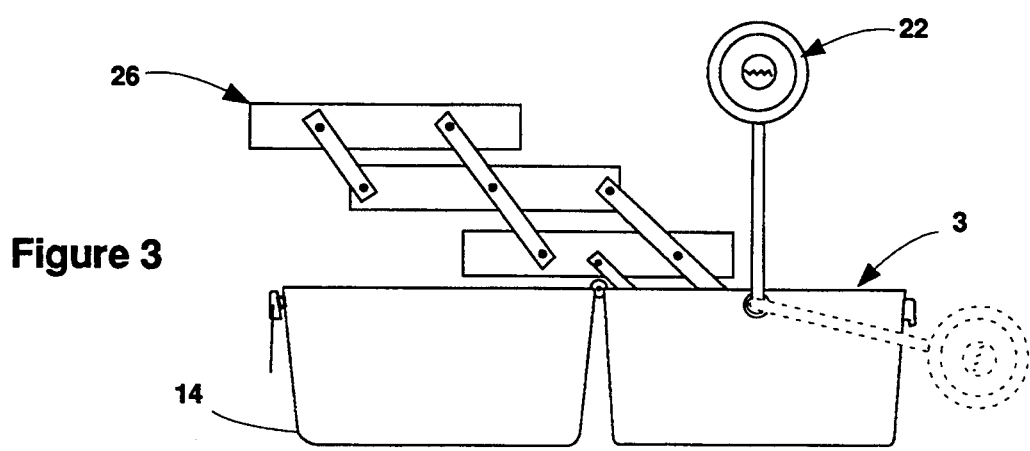
FIG. 3 is a side elevation of the tackle box of FIG. 1, shown with the lid in the open position and the folding tray assembly in the extended position.

FIGS. 1-3 specifically disclose an embodiment of the invention in which handle 20 includes flashlight 22 and interior illuminating light 24, both lights being integral to handle 20. Flashlight 22 generally includes flashlight bulb 28 and reflector 38. Interior illuminating light 24 generally includes light bulb 30 and light diffuser 36. Light diffuser 36 is employed to more broadly and uniformly project the light produced by light bulb 30, thereby better illuminating the contents of box section 3 and folding tray assembly 26. Switch button 32 controls the operation of the two lights. Electrical energy is generally provided to flashlight bulb 28 and interior illuminating light bulb 30 from a series of batteries located in battery compartment 19 of transverse beam 21 via an electrical circuit (shown in FIGS. 17-20). Pins 40 of handle 20 and carriages 56 of box section 3, best shown in FIG. 10, enables handle 20 to be rotated such that the lid can be opened and closed (shown in FIG. 3).

Figure 4:
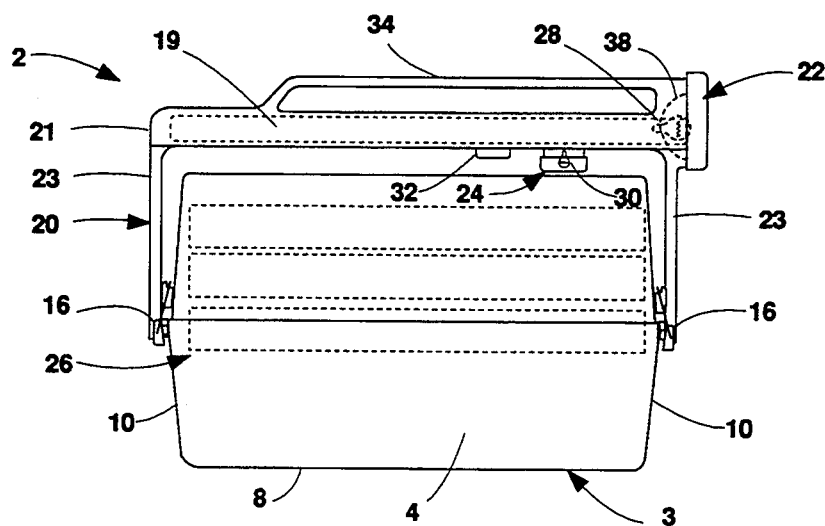
FIG. 4 is a front elevation of a tackle box having a flashlight and an interior illuminating light which are integral to the handle.
Figure 5:
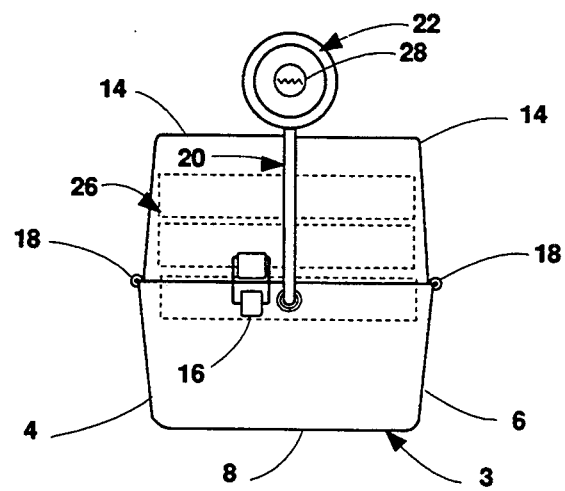
FIG. 5 is a side elevation of the tackle box of FIG. 4, shown with the lid in the closed position.
Figure 6:
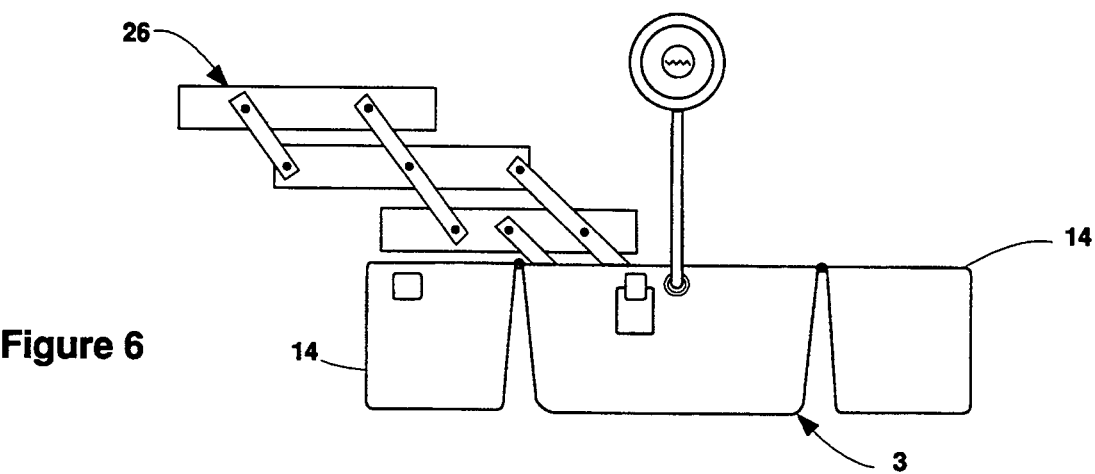
FIG. 6 is a side elevation of the tackle box of FIG. 4, shown with the lid in the open position and the folding tray assembly in the extended position.

FIGS. 4-6 disclose an embodiment of the invention including hand grip 34, lid 14 consisting of two sections, and an alternate interior illuminating light configuration. Hand grip 34 provides a location on handle 3 where the handle can be gripped by hands of all sizes. Alternately, transverse beam 21 would provide the gripping surface and its size would be governed by the size of battery compartment 19 required by the batteries. Although not shown, battery compartment 19 could alternately be located in side arms 23 to reduce the overall size of transverse beam 21. However, this would increase the size of side arms 23 and potentially require additional electrical components.

Figure 7:
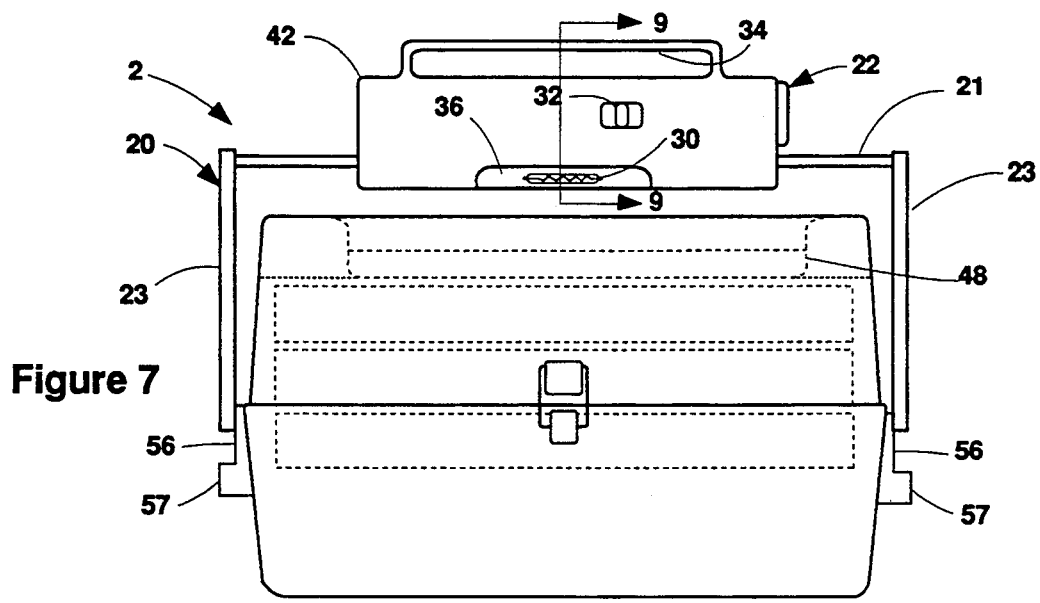
FIG. 7 is a front elevation of a tackle box having a retractable handle and a pivoting lighting module which is supported by the handle, the lighting module having the capability of being stowed in a recessed portion of the lid.
Figure 8:
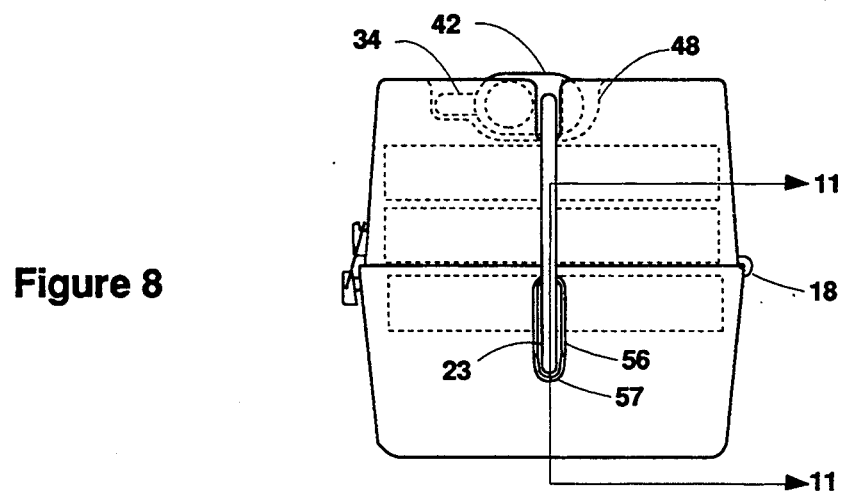
FIG. 8 is a side elevation of the tackle box of FIG. 7, shown with the handle in the retracted position and the lighting module in the stowed position.

FIGS. 7 and 8 disclose an embodiment of the invention including a lighting module 42 which is structurally supported by handle 20, handle 20 capable of being retracted, and lid 14 having a recessed portion 48 for stowing handle 20 and lighting module 42. Lighting module 42 is shown having flashlight 22 and interior illuminating light 24. Preferably, transverse beam 21 would pass completely through lighting module 42 such that lighting module 42 can be rotated with respect to handle 20. Handle 20 is retractable by virtue of carriages 56 having an elongated shape (best shown in FIG. 11) such that pins 40 can travel up and down, thereby allowing handle 20 to be retracted. Cradle 57 located at the bottom of carriage 56 enables handle 20 to be positioned directly over box section 3. With lid 14 in the open position, handle 20 can be retracted such that side arms 23 engage in cradles 57, thereby holding handle 20 in a fixed position. Recessed portion 48 of lid 14 allows handle 20 and lighting module 42 to be stowed substantially flush with the top of lid 14.

Figure 9:
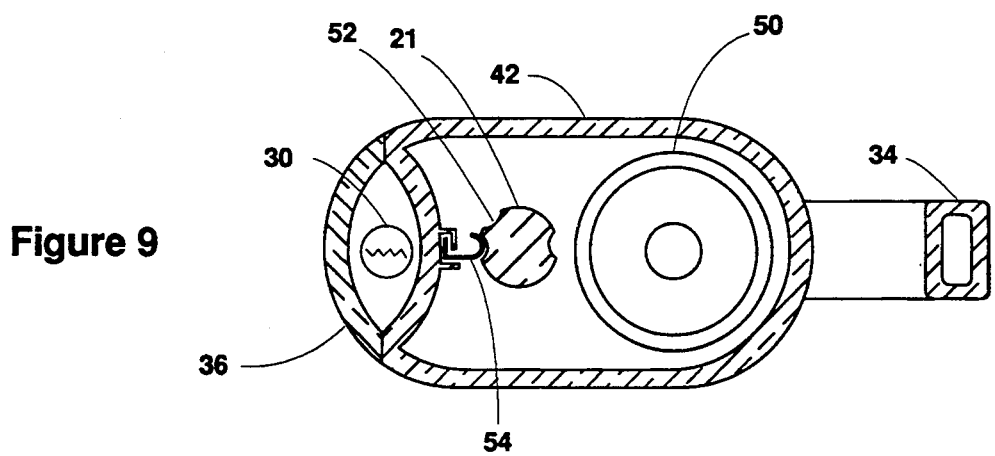
FIG. 9 is an expanded cross sectional view of the portion indicated by the line 9—9 in FIG. 7 showing a mechanism for positioning the lighting module relative to the handle.

FIG. 9 discloses an embodiment of the invention including a positioning mechanism which enables lighting module 42 to be positioned relative to handle 20. Spring 54 forcibly engages in notches 52 of transverse beam 21 such that the position of lighting module 42 is maintained constant relative to handle 20.

FIG. 12 disclosed an alternate configuration for handle 20 wherein the flashlight 22 is omitted and two interior illuminating lights 24 are provided.

FIG. 13 discloses an alternate configuration for lighting module 42 wherein flashlight 22 is omitted and two interior illuminating lights 24 are provided.

Figure 14:
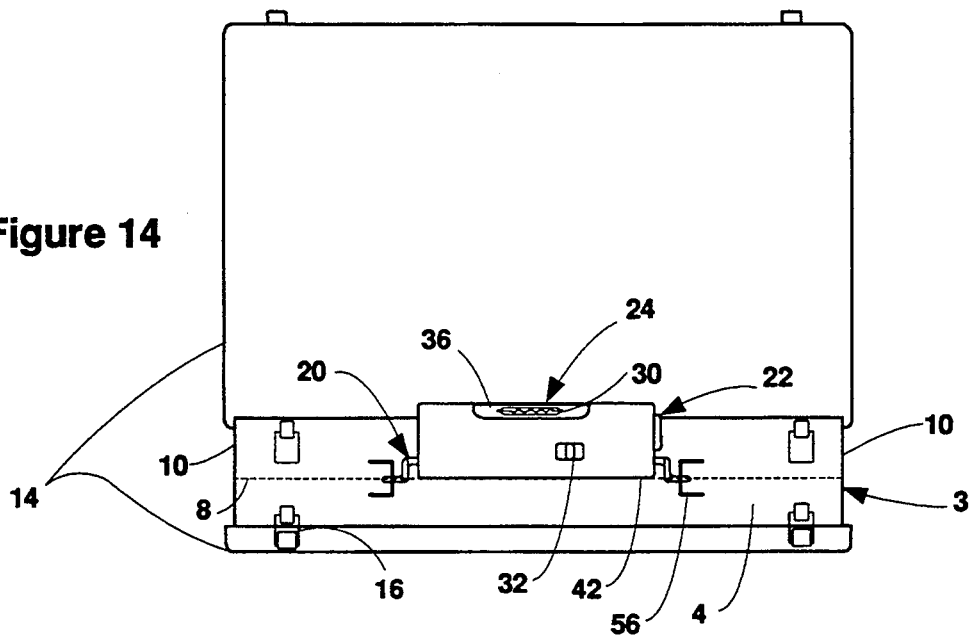
FIG. 14 is a front elevation of a flat-lying, two-sided tackle box with interior illumination and a flashlight, shown with one of the lids in the open position.
Figure 15:
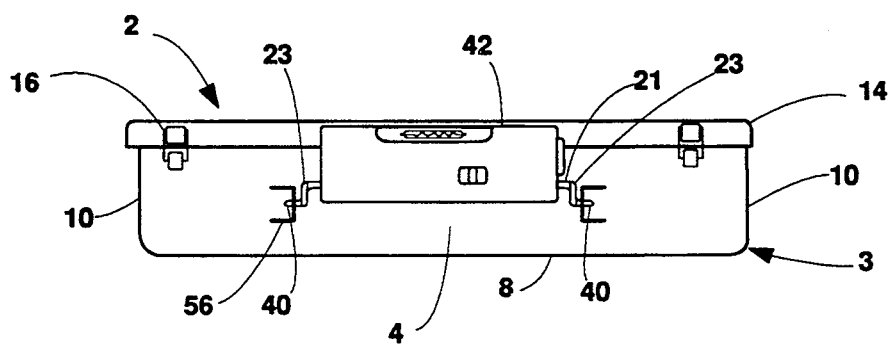
FIG. 15 is a front elevation of a flat lying, one-sided tackle box with interior illumination and a flashlight, shown with the lid in the closed position.

Referring now to FIGS. 14 and 15, tackle box 2 is of the lay-flat, type having a lighting module 42 with flashlight 22 and interior illuminating light 24. Preferably, lighting module 42 is structurally supported by handle 20. FIG. 14 shows tackle box 2 being double-sided and FIG. 15 shows tackle box 2 being single sided.

Figure 16:
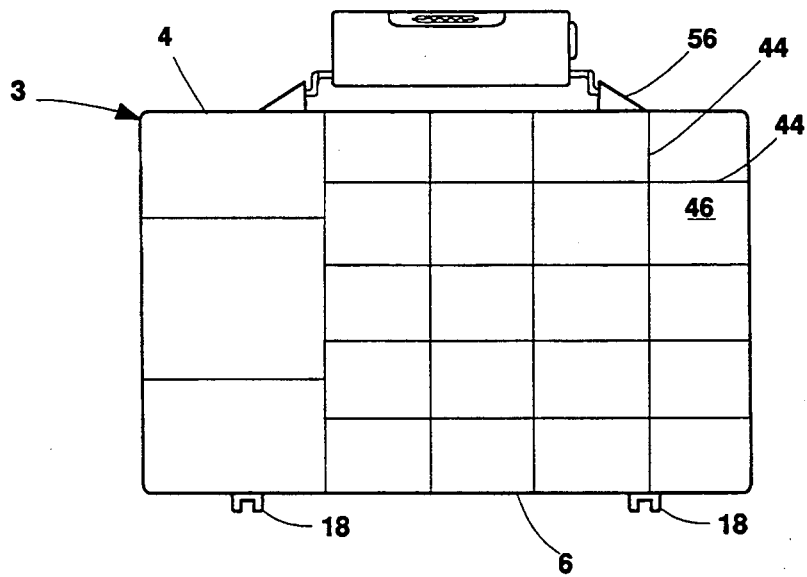
FIG. 16 is a top view of the tackle box of FIG. 15 with the lid removed showing the internal storage compartments.

FIG. 16 discloses an embodiment of the invention (shown with lid 14 removed for clarity) having a plurality of interior walls 44 establishing a plurality of compartments 46.

Figure 17:
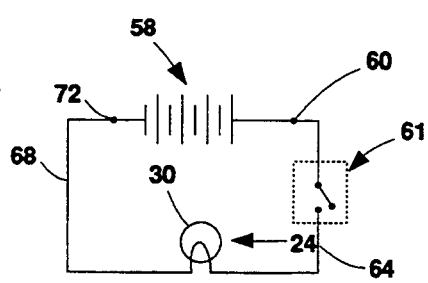
FIG. 17 is an electrical wiring diagram of a circuit having an interior illuminating light which is controlled by a single switch.
Figure 18:
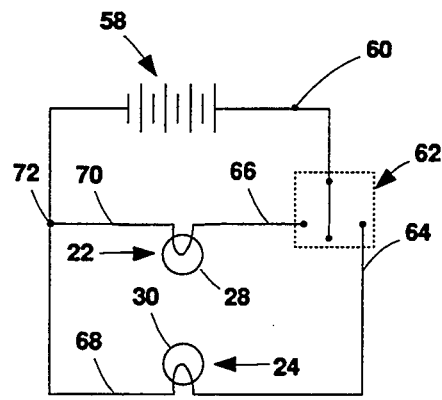
FIG. 18 is an electrical wiring diagram of a circuit having an interior illuminating light and a flashlight, both being controlled by a single switch.
Figure 19:
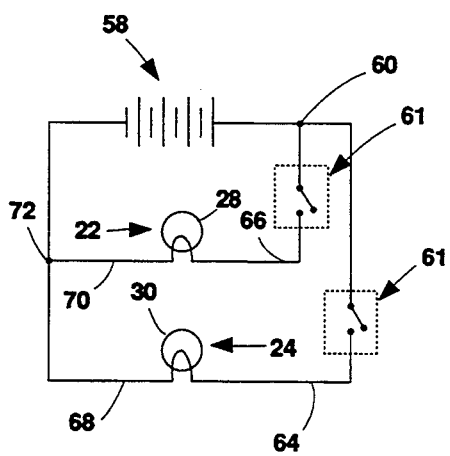
FIG. 19 is an electrical wiring diagram of a circuit having an interior illuminating light and a flashlight, each being controlled by separate switches.
Figure 20:
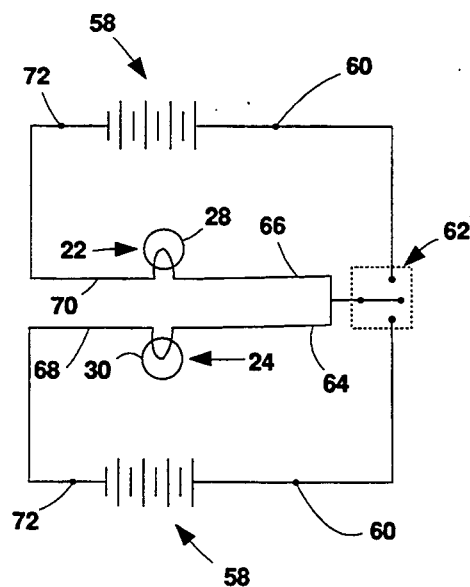
FIG. 20 is an electrical wiring diagram of a circuit having an interior illuminating light and a flashlight, each having a separate power supply and both being controlled by a single switch.

Referring to FIGS. 17-20, the electrical circuits shown include a power supply 58 generally consisting of a series of batteries. In the preferred case, power supply 58 has a positive terminal 60 and a negative terminal 72. As shown in FIG. 17, interior illuminating light 24 has a light bulb 30 with positive lead 64 and negative lead 68. Negative lead 68 terminates into negative terminal 72 of power supply 58 while positive lead 64 terminates into single-pole, single throw switch 61. Switch 61 is further terminated into positive terminal 60 of power supply 58, thereby completing the circuit. FIG. 18 discloses a circuit including interior illuminating light 24 and flashlight 22 connected to power supply 58 through single-pole, double-throw switch 62. Interior illuminating light bulb 30 is wired similar to that of FIG. 17 except that positive lead 64 is terminated into single-pole, double throw switch 62 rather than single pole, single-throw switch 61 of FIG. 17. Furthermore, Negative lead 70 of flashlight bulb 28 is terminated into negative terminal 72 of power supply 58 and positive lead 66 of flashlight bulb 28 is terminated into the second side of single-pole, double-throw switch 62. The circuitry of FIG. 19 is similar to that of FIG. 18 except that flashlight 24 and interior illuminating light 24 are independently controlled by two separate single-pole, single-throw switches 61. The circuit of FIG. 20 is functionally identical to that of FIG. 18 except that flashlight 22 and interior illuminating light 24 have separate power supplies 58.

Although the description above contains many specifics, these should not be construed as limiting the scope of the invention, but as merely providing illustrations of some of the preferred and potential embodiments of the invention at the time this application was drafted. Thus, the scope of the invention should be determined by the appended claims and their legal equivalents along with the examples and descriptions given, rather than by the examples and descriptions alone.

I claim:

1. A portable container having an interior illuminating light for illuminating the interior of said container, said portable container comprising:

a box having facing front and rear walls, facing end walls, and a bottom, said walls being integral to said bottom, a lid having means for hinging said lid to a wall, wherein said lid is movable between a container closed position where said lid overlies and closes said box, and an open position where said lid is disposed such that access may be had to the interior of said container, said box and said lid jointly defining a substantially enclosed storage compartment when said lid is in the closed position, a pivotal handle attached to said box for carrying the box and attached lid, said handle including a housing, said housing containing an interior illuminating light and a power supply for said light, said interior illuminating light emitting a beam of light generally transverse to said handle, said interior illuminating light directly illuminating the storage compartment of said container when said lid is in an open position.

2. The container of claim 1, wherein said pivotal handle comprises a transverse beam, and side arms attached to opposing ends of said transverse beam, said side arms pivotally attached to said box, and said housing pivotally mounted on said transverse beam.

3. The container of claim 1, wherein said lid comprises a top, facing front and rear walls, and facing side walls, said walls being integral to said top.

4. The container of claim 1, wherein said container includes a folding tray assembly within said storage compartment.

5. The container of claim 1, further including a flashlight housed in said handle, said flashlight emitting a beam of light generally parallel to said handle, said flashlight illuminating the path of a person carrying the portable container.

6. The container of claim 5, wherein said pivotal handle comprises a transverse beam, and side arms attached to opposing ends of said transverse beam, said side arms pivotally attached to said box, and said housing pivotally mounted on said transverse beam.

7. A portable container having an interior illuminating light for illuminating the interior of said container and a flashlight for illuminating the path of a person carrying the portable container, said portable container comprising:
 a box having facing front and rear walls, facing end walls, and a bottom, said walls being integral to said bottom,
 a lid having means for hinging said lid to a wall, wherein said lid is movable between a container closed position where said lid overlies and closes said box, and an open position where said lid is disposed such that access may be had to the interior of said container, said box and said lid jointly defining a substantially enclosed storage compartment when said lid is in the closed position,
 a pivotal handle attached to said box for carrying the box and attached lid, said handle including a housing,
 said housing containing an interior illuminating light, a flashlight, and a power supply for said lights,
 said interior illuminating light emitting a beam of light generally transverse to said handle, said interior illuminating light directly illuminating the storage compartment of said container when said lid is in an open position,
 said flashlight emitting a beam of light generally parallel to said handle, said flashlight illuminating the path of a person carrying the portable container.

8. The container of claim 7, wherein said pivotal handle comprises a transverse beam, and side arms attached to opposing ends of said transverse beam, said side arms pivotally attached to said box, and said housing pivotally mounted on said transverse beam.

9. The container of claim 7, wherein said lid comprises a top, facing front and rear walls, and facing side walls, said walls being integral to said top.

10. The container of claim 7, wherein said container includes a folding tray assembly within said storage compartment.

11. A portable container having an interior illuminating light for illuminating the interior of said container, said portable container comprising:
 a box having facing front and rear walls, facing end walls, and a bottom, said walls being integral to said bottom,
 a lid having means for hinging said lid to a wall, wherein said lid is movable between a container closed position where said lid overlies and closes said box, and an open position where said lid is disposed such that access may be had to the interior of said container, said box and said lid jointly defining a substantially enclosed storage compartment when said lid is in the closed position,
 a handle for carrying the box and attached lid, said handle having a housing therein,
 side arms attached to opposing ends of said handle and pivotally attached to facing walls of said box,
 said housing containing an interior illuminating light, and a power supply for said light,
 said interior illuminating light emitting a beam of light generally transverse to said handle, said interior illuminating light directly illuminating the storage compartment of said container when said lid is in an open position.

12. The container of claim 11, further including a flashlight housed in said handle, said flashlight emitting a beam of light generally parallel to said handle, said flashlight illuminating the path of a person carrying the portable container.

13. The container of claim 11, wherein said lid comprises a top, facing front and rear walls, and facing side walls, said walls being integral to said top.

14. The container of claim 11, wherein said container includes a folding tray assembly within said storage compartment.

15. In combination, a portable container and an interior illuminating light for illuminating the interior of said portable container, comprising:
 a box having facing front and rear walls, facing end walls, and a bottom, said walls being integral to said bottom,
 a lid having means for hinging said lid to a wall, wherein said lid is movable between a container closed position where said lid overlies and closes said box, and an open position where said lid is disposed such that access may be had to the interior of said container, said box and said lid jointly defining a substantially enclosed storage compartment when said lid is in the closed position,
 a pivotal handle attached to said box for carrying the box and attached lid, said handle including a housing,
 said housing containing an interior illuminating light, and a power supply for said light,
 said interior illuminating light emitting a beam of light generally transverse to said handle, said interior illuminating light directly illuminating the storage compartment of said container when said lid is in an open position.

16. The container of claim 15, wherein said pivotal handle comprises a transverse beam, and side arms attached to opposing ends of said transverse beam, said side arms pivotally attached to said box, and said housing pivotally mounted on said transverse beam.

17. The container of claim 15, wherein said lid comprises a top, facing front and rear walls, and facing side walls, said walls being integral to said top.

18. The container of claim 15, wherein said container includes a folding tray assembly within said storage compartment.

19. The container of claim 15, further including a flashlight housed in said handle, said flashlight emitting a beam of light generally parallel to said handle, said flashlight illuminating the path of a person carrying the portable container.

20. The container of claim 19, wherein said pivotal handle comprises a transverse beam, and side arms attached to opposing ends of said transverse beam, said side arms pivotally attached to said box, and said housing pivotally mounted on said transverse beam.

* * * * *